(12) United States Patent
Yoshikawa

(10) Patent No.: US 10,937,454 B2
(45) Date of Patent: Mar. 2, 2021

(54) ACTUATOR ASSEMBLY HAVING DUAL SENSORS FOR DETECTING THE VIBRATION ON MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Norio Yoshikawa, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/789,579

(22) Filed: Feb. 13, 2020

(65) Prior Publication Data
US 2020/0184999 A1 Jun. 11, 2020

Related U.S. Application Data

(63) Continuation of application No. 16/111,782, filed on Aug. 24, 2018, now Pat. No. 10,614,845.

(30) Foreign Application Priority Data

Mar. 8, 2018 (JP) .............................. JP2018-042312

(51) Int. Cl.
*G11B 5/55* (2006.01)
*G11B 5/48* (2006.01)
*H02K 41/035* (2006.01)

(52) U.S. Cl.
CPC .......... *G11B 5/5582* (2013.01); *G11B 5/4846* (2013.01); *G11B 5/5526* (2013.01);
(Continued)

(58) Field of Classification Search
None
See application file for complete search history.

(56) References Cited

U.S. PATENT DOCUMENTS 5,426,545 A 6/1995 Sidman et al.
5,526,208 A 6/1996 Hatch et al.
(Continued)

FOREIGN PATENT DOCUMENTS

CN 101359479 A 2/2009
JP 2002-124049 A 4/2002
(Continued)

OTHER PUBLICATIONS

Fu-Ying Huang et al., "Active Damping in HDD Actuator", IEEE Transactions on Magnetics (vol. 37, No. 2), pp. 847-849 (Mar. 2001).

*Primary Examiner* — Tan X Dinh
(74) *Attorney, Agent, or Firm* — White & Case LLP

(57) ABSTRACT

According to one embodiment, a magnetic disk device includes a base that includes a bottom wall and side walls standing along a circumference of the bottom wall, a housing that includes a cover facing the bottom wall and closing the base, an actuator assembly that is housed inside the housing and is rotatable around a rotation axis, a head movably supported by the actuator assembly, a control circuit board provided outside of the housing, a first sensor disposed on the control circuit board, and a second sensor disposed inside the housing.

13 Claims, 9 Drawing Sheets

(52) U.S. Cl.
CPC ....... *G11B 5/5552* (2013.01); *H02K 41/0358*
(2013.01); *G11B 5/553* (2013.01); *G11B*
*5/5591* (2013.01); *H02K 41/0354* (2013.01)

(56) References Cited

U.S. PATENT DOCUMENTS

| | | | |
|---|---|---|---|
| 6,064,540 A | 5/2000 | Huang et al. | |
| 6,101,058 A * | 8/2000 | Morris | G05B 21/02 360/69 |
| 6,496,320 B1 | 12/2002 | Liu | |
| 6,496,323 B1 | 12/2002 | Umeda et al. | |
| 6,614,613 B1 | 9/2003 | Huang et al. | |
| 6,674,600 B1 * | 1/2004 | Codilian | G11B 5/5582 360/75 |
| 6,771,454 B2 | 8/2004 | White et al. | |
| 6,914,743 B1 | 7/2005 | Narayana et al. | |
| 7,215,504 B1 | 5/2007 | Bennett | |
| 7,391,586 B2 * | 6/2008 | Keast | G11B 5/6005 360/31 |
| 7,495,857 B1 | 2/2009 | Bennett | |
| 7,570,451 B2 * | 8/2009 | Bedillion | G11B 5/59633 360/78.05 |
| 8,794,073 B2 | 8/2014 | Kasai et al. | |
| 9,858,955 B1 | 1/2018 | Cao et al. | |
| 10,566,017 B2 * | 2/2020 | Yoshikawa | G11B 5/5552 |
| 10,614,845 B2 * | 4/2020 | Yoshikawa | H02K 41/0358 |
| 2002/0122267 A1 * | 9/2002 | Morioka | G11B 5/5552 360/75 |
| 2002/0135928 A1 | 9/2002 | Aikawa et al. | |
| 2003/0103287 A1 | 6/2003 | Agematsu | |
| 2003/0112547 A1 * | 6/2003 | Koso | G11B 5/5582 360/78.05 |
| 2005/0146807 A1 * | 7/2005 | Huang | G11B 5/5552 360/78.05 |
| 2007/0183076 A1 * | 8/2007 | Baugh | G11B 5/59622 360/75 |
| 2008/0170320 A1 | 7/2008 | Funabashi et al. | |
| 2009/0034116 A1 | 2/2009 | Higashino et al. | |
| 2009/0034117 A1 | 2/2009 | Higashino | |
| 2009/0122438 A1 | 5/2009 | Matsuzawa et al. | |
| 2010/0061007 A1 | 3/2010 | Matsushita et al. | |
| 2011/0085260 A1 * | 4/2011 | Wada | G11B 19/042 360/75 |
| 2013/0194691 A1 | 8/2013 | Hara et al. | |
| 2019/0279671 A1 | 9/2019 | Yoshikawa | |
| 2020/0211587 A1 * | 7/2020 | Yoshikawa | G11B 5/4846 |

FOREIGN PATENT DOCUMENTS

| | | |
|---|---|---|
| JP | 2019-160356 A | 9/2019 |
| WO | 2005-052601 A1 | 6/2005 |

* cited by examiner

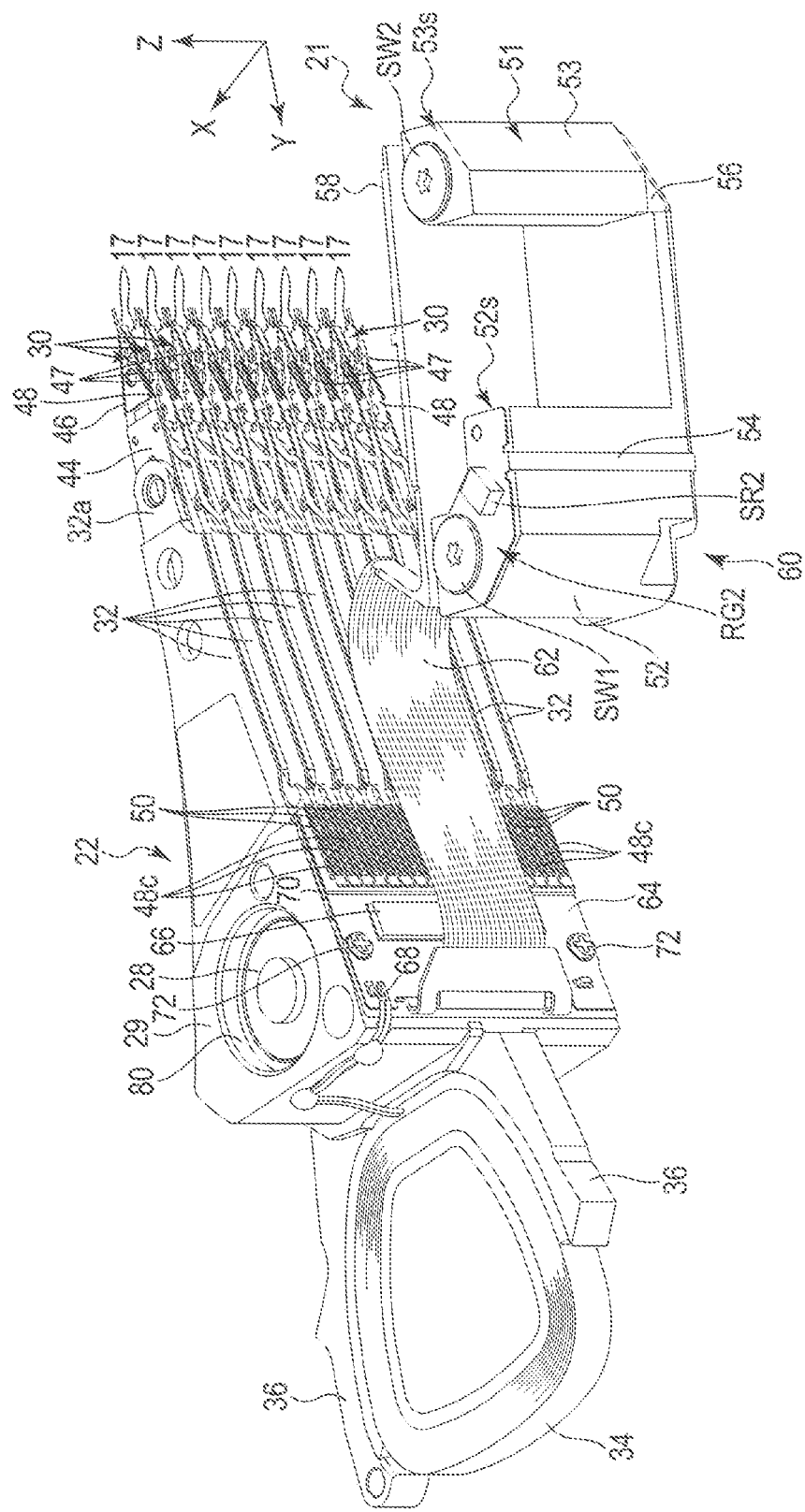
F I G. 7

US 10,937,454 B2

ACTUATOR ASSEMBLY HAVING DUAL SENSORS FOR DETECTING THE VIBRATION ON MAGNETIC DISK DEVICE

CROSS-REFERENCE TO RELATED APPLICATIONS

This application is continuation of application Ser. No. 16/111,782 filed Aug. 24, 2018 which is based upon and claims the benefit of priority from Japanese Patent Application No. 2018-042312, filed Mar. 8, 2018, the entire contents of which are incorporated herein by reference.

FIELD

Embodiments described herein relate generally to a magnetic disk device.

BACKGROUND

A magnetic disk device, for example, a hard disk drive (HDD) generally includes a magnetic disk disposed in a housing, a spindle motor supporting and rotating the magnetic disk, an actuator assembly supporting a magnetic head, a voice coil motor driving the actuator assembly, a printed circuit board, and the like.

The magnetic disk device vibrates due to a disturbance, for example, a sound pressure, generated from a fan installed outside the magnetic disk device. When the magnetic disk device vibrates as described above, it is likely that a positioning error of the magnetic head mounted on the actuator assembly will be increased.

BRIEF DESCRIPTION OF THE DRAWINGS

FIG. 7 is a perspective view of the actuator assembly and a flexible printed circuit (FPC) unit viewed from one side;

DETAILED DESCRIPTION

In general, according to one embodiment, a magnetic disk device comprises: a base that comprises a bottom wall and side walls standing along a circumference of the bottom wall; a housing that comprises a cover facing the bottom wall and closing the base; an actuator assembly that is housed inside the housing and is rotatable around a rotation axis; a head movably supported by the actuator assembly; a control circuit board provided outside of the housing; a first sensor disposed on the control circuit board; and a second sensor disposed inside the housing.

Hereinafter, embodiments will be described with reference to the drawings. It should be noted that the drawings are an example, and do not limit the scope of the invention.

First Embodiment

Figure 1:
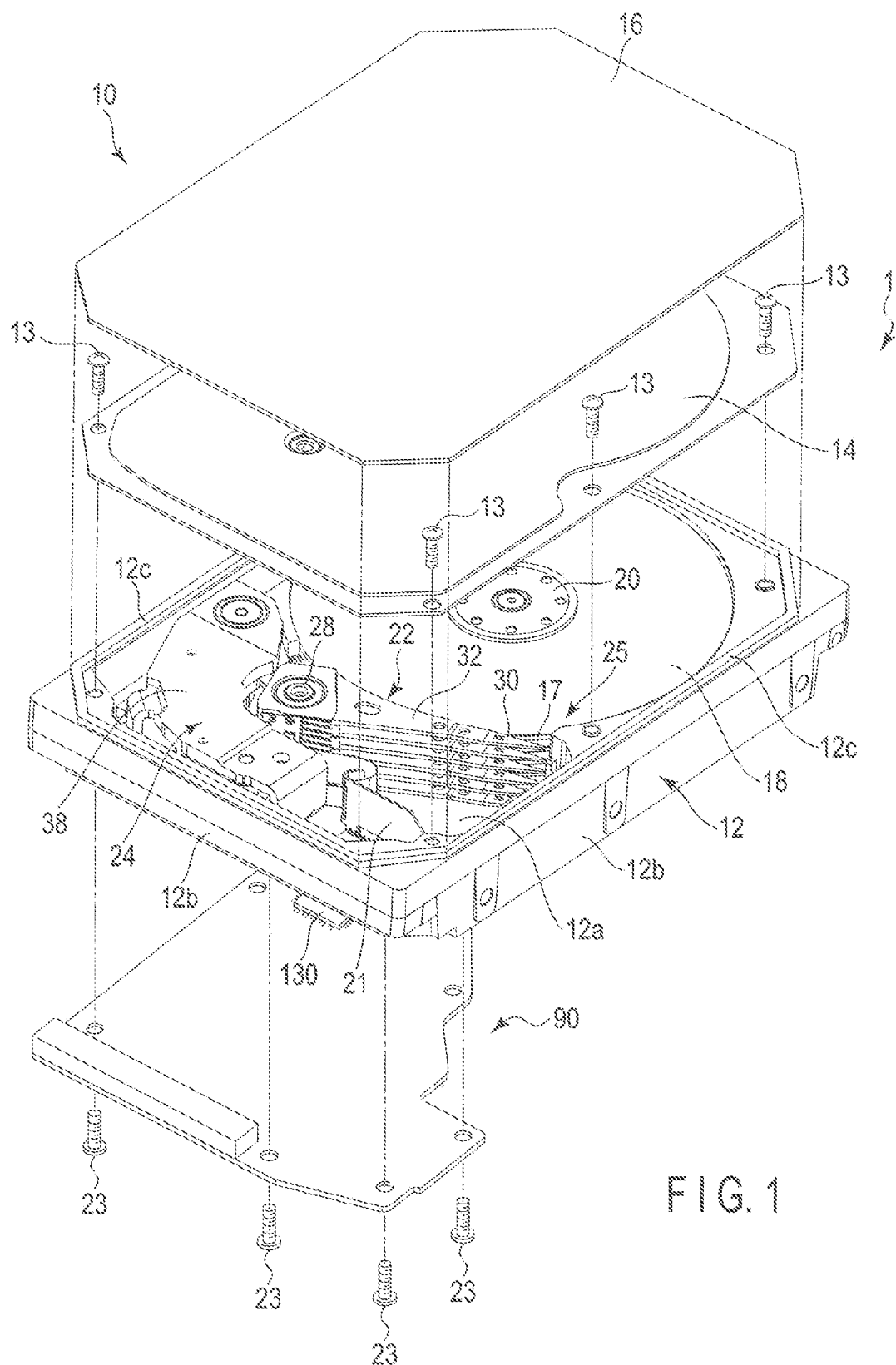
FIG. 1 is an exploded perspective view showing an internal structure of a magnetic disk device according to a first embodiment.

FIG. 1 is an exploded perspective view showing an internal structure of a magnetic disk device 1 according to a first embodiment.

The magnetic disk device 1 has a housing 10 having a substantially rectangular shape. The housing 10 has a base 12 with an opened upper surface and a rectangular box shape, an inner cover 14 screwed to the base 12 by a plurality of screws 13 and closing an upper end opening of the base 12, and an outer cover (a top cover) 16 disposed to overlap the inner cover 14 and having a circumferential portion welded to the base 12. Hereinafter, a direction toward the inner cover 14 and the outer cover 16 will be referred to as upward direction (or simply upward), and a direction opposite to the upward direction will be referred to as a downward direction (or simply downward). The base 12 has a bottom wall 12a facing the inner cover 14 with a gap therebetween and having a rectangular shape and side walls 12b standing along a circumference of the bottom wall 12a. The base 12 is integrally molded by, for example, aluminum. The side walls 12b include a pair of long side walls facing each other and a pair of short side walls facing each other. A fixing rib 12c having a substantially rectangular frame shape protrude on upper end surfaces of the side walls 12b.

The inner cover 14 is formed in a rectangular plate shape using, for example, stainless steel. A circumferential portion of the inner cover 14 is screwed to upper surfaces of the side walls 12b of the base 12 by the screws 13, and fixed to an inner side of the fixing rib 12c. The outer cover 16 is formed in a rectangular plate shape by, for example, aluminum. The outer cover 16 is formed to have a plane dimension slightly larger than that of the inner cover 14. The outer cover 16 is welded to the fixing rib 12c of the base 12 over the entire circumferential portion thereof, such that it is air-tightly fixed.

The housing 10 is provided with a plurality of magnetic disks, for example, five to nine magnetic disks (hereinafter, simply referred to as disks) 18 as recording media, and a spindle motor 20 as a driving section supporting and rotating the disks 18. The spindle motor 20 is disposed on the bottom wall 12a. The respective disks 18 have magnetic recording layers provided on upper and/or lower surfaces thereof. The respective disks 18 are coaxially fitted into a hub (not shown) of the spindle motor 20, and are clamped by a clamp spring and fixed to the hub. As a result, the respective disks 18 are supported in a state in which they are located in parallel with the bottom wall 12a of the base 12. The disk 18 rotates at a particular revolution per minute (RPM) by the spindle motor 20.

In the present embodiment, the five to nine disks 18 are housed in the housing 10, but the number of the disks 18 is not limited thereto. In addition, a single disk 18 may also be housed in the housing 10.

The housing 10 are provided with a plurality of magnetic heads (hereinafter, simply referred to as heads) 17 writing and reading information to and from the disks 18 and an actuator assembly (actuator) 22 movably supporting these heads 17 with respect to the disks 18. In addition, the housing 10 is provided with a voice coil motor (hereinafter, referred to as a VCM) 24 controlling operations such as rotation and positioning of the actuator assembly 22, a ramp load mechanism 25 maintaining the head 17 at an unload position at which the head 17 is spaced apart from the disk 18 when the head 17 moves to the outermost periphery of the disk 18, and a board unit (a wiring member) 21. The board unit 21 is formed of a flexible printed wiring board (FPC). This FPC is electrically connected to the heads 17 and a voice coil 34 (to be described later) of the VCM 24 through a relay FPC on the actuator assembly 22.

The actuator assembly 22 has a bearing unit 28 that is rotatable, a plurality of arms 32 extending from the bearing unit 28, and suspension assemblies (suspensions) 30 extending from the respective arms 32. The heads 17 are supported at tip portions of the respective suspension assemblies 30. The actuator assembly 22 moves the head 17 to a particular position on the disk 18 by driving of the VCM 24.

A printed circuit board (a control circuit board) 90 is screwed to an outer surface (a bottom surface) of a bottom wall 12a of the base 12 by a plurality of screws 23. The control circuit board 90 faces the bottom wall 12a of the base 12 with a slight gap therebetween. An insulating sheet (not shown) as an insulating member is disposed between the outer surface of the bottom wall 12a of the base 12 and the control circuit board 90. Electronic components such as a semiconductor chip and a control section (a controller) 130 are mounted on an inner surface (a surface facing the base 12) of the control circuit board 90. The control circuit board 90 has a connector (not shown). This connector is electrically connected to the FPC unit 21. The control section 130 controls an operation of the spindle motor 20, and controls operations of the VCM 24 and the heads 17 through the board unit 21.

Figure 2:
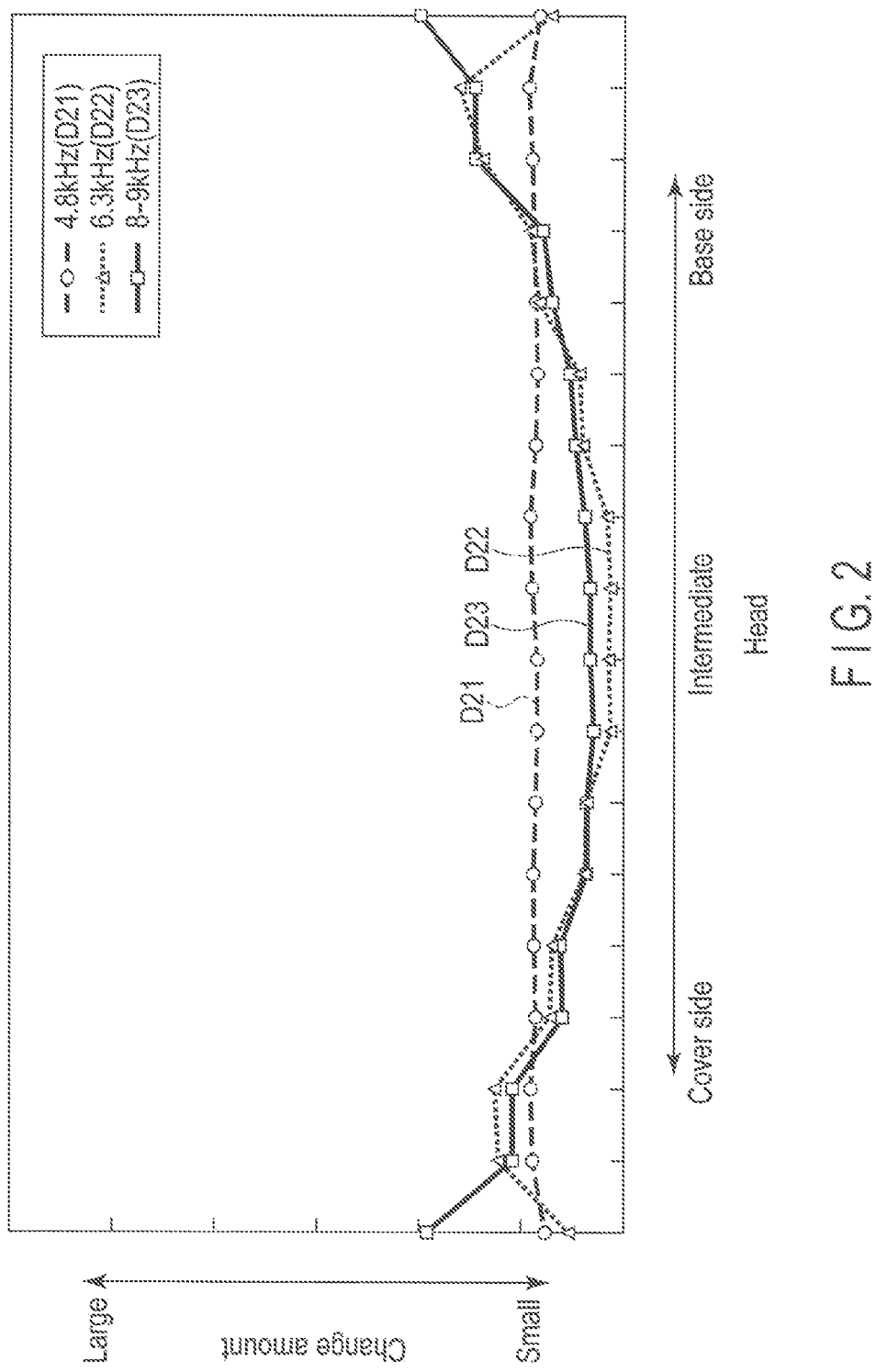
FIG. 2 is a view showing an example of change amounts in positioning errors of the respective heads when the magnetic disk device vibrates at the respective frequencies.

FIG. 2 is a view showing an example of change amounts in positioning errors of the respective heads 17 when the magnetic disk device 1 vibrates at the respective frequencies. FIG. 2 shows increase amounts (hereinafter, referred to as change amounts) in positioning errors of the respective heads 17 when the magnetic disk device 1, for example, the housing 10, vibrates due to a disturbance. In FIG. 2, a vertical axis indicates a change amount, and a horizontal axis indicates the respective heads 17 from an inner cover 14 side (hereinafter, referred to as a cover side) to a bottom wall 12a side (hereinafter, referred to as a base side). In FIG. 2, it is shown that the positioning errors of the respective heads 17 are increased (deteriorated) as the change amounts increase. Hereinafter, in a region supporting the plurality of heads 17 by the actuator assembly 22, a region of the cover side is simply referred to as a cover region, a region of the base side is referred to as a base region, and a region between the cover region and the base region is referred to as an intermediate region. In addition, heads 17 located in the cover region are referred to as heads 17 of the cover side, heads 17 located in the base region are referred to as heads 17 of the base side, and heads 17 located in the intermediate region are referred to as intermediate heads 17. Due to a disturbance such as a sound pressure by a fan for cooling a central processing unit (CPU), or the like, of a server, the magnetic disk device 1 (the housing 10) can vibrate at a frequency of, for example, 4 to 9 kHz. In FIG. 2, as an example, a distribution (hereinafter, referred to as a distribution of change amounts of 4.8 kHz) D21 of change amounts in positioning errors from the heads 17 of the cover side to the heads 17 of the base side when the magnetic disk device 1 vibrates at a frequency of 4.8 kHz, a distribution (hereinafter, referred to as a distribution of change amounts of 6.3 kHz) D22 of change amounts in positioning errors from the heads 17 of the cover side to the heads 17 of the base side when the magnetic disk device 1 vibrates at a frequency of 6.3 kHz, and a distribution (hereinafter, referred to as a distribution of change amounts of 8 to 9 kHz) D23 of change amounts in positioning errors from the heads 17 of the cover side to the heads 17 of the base side when the magnetic disk device 1 vibrates at a frequency of 8 to 9 kHz are shown.

As shown by the distribution D21 of the change amounts of 4.8 kHz, when the magnetic disk device 1 vibrates at the frequency of 4.8 kHz, change amounts of the respective heads 17 from the heads 17 on the cover side to the heads 17 on the base side are substantially constant. As shown by the distribution D22 of the change amounts of 6.3 kHz and the distribution D23 of the change amounts of 8 to 9 kHz, when the magnetic disk device 1 vibrates at the frequencies of 6.3 kHz and 8 to 9 kHz, change amounts of the heads 17 of the cover side and the heads 17 of the base side are larger than those of the intermediate heads 17. When the magnetic disk device 1 vibrates at the frequencies of 6.3 kHz and 8 to 9 kHz, the change amounts of the heads 17 of the cover side and the heads 17 of the base side are larger than those of the intermediate heads 17. The change amounts of the heads 17 of the cover side and the heads 17 of the base side when the magnetic disk device 1 vibrates at the frequencies of 6.3 kHz and 8 to 9 kHz are larger than those of the heads 17 of the cover side and the heads 17 of the base side when the magnetic disk device 1 vibrates at the frequency of 4.8 kHz. The change amounts of the intermediate heads 17 when the magnetic disk device 1 vibrates at the frequencies of 6.3 kHz and 8 to 9 kHz are larger than those of the intermediate heads 17 when the magnetic disk device 1 vibrates at the frequency of 4.8 kHz.

Figure 3:
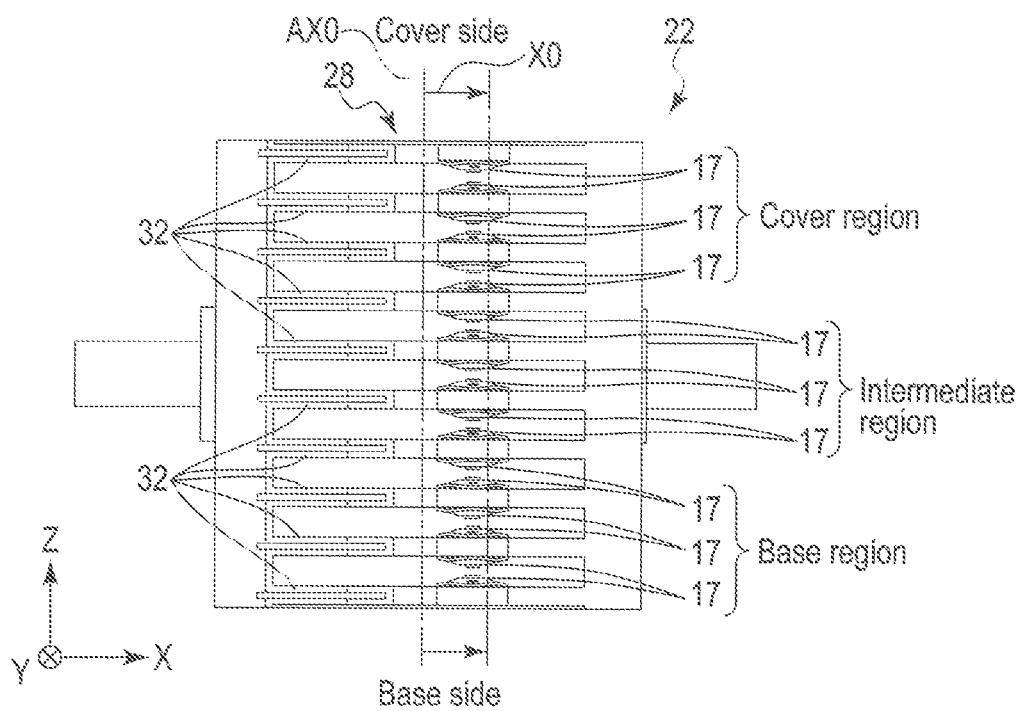
FIG. 3 is a schematic view showing an example of an actuator assembly when the magnetic disk device vibrates at a frequency of 4.8 kHz shown in FIG. 2.

FIG. 3 is a schematic view showing an example of the actuator assembly 22 when the magnetic disk device 1 vibrates at the frequency of 4.8 kHz shown in FIG. 2. FIG. 3 shows the actuator assembly 22 viewed from the head 17 side. In FIG. 3, only components required for a description are shown. In FIG. 3, a first direction X, a second direction Z, and a third direction Y are orthogonal to each other, but may also intersect with each other in a state in which they are not orthogonal to each other. Hereinafter, a direction toward a tip of an arrow indicating the first direction X will be referred to as a right side (or simply referred to as a right), and a direction from the tip of the arrow indicating the first direction X toward the other side will be referred to as a left side (or simply referred to as a left). The first direction X corresponds to a moving direction (hereinafter, also referred to as a movement direction or a translation direction) of each head 17. In the second direction Z, a direction toward a tip of an arrow indicating the second direction Z is upward, and a direction from the tip of the arrow indicating the second direction to the other side is downward. In addition, a length of an object in the second direction Z may also be referred to as a thickness or a height, and the second direction Z may be referred to as a thickness direction or a height direction.

As shown in FIG. 3, in the actuator assembly 22, the plurality of heads 17 are arranged at intervals in the second direction Z. When the magnetic disk device 1 vibrates at the frequency of 4.8 kHz, the respective heads 17 vibrate in the first direction X. In this case, substantially the same acceleration is applied to each head 17 in the first direction X. For this reason, the respective heads 17 are displaced by substantially the same distance in the first direction X with respect to an axis (hereinafter, referred to as a reference axis) AX0 passing through the bearing unit 28. The reference axis AX0 corresponds to, for example, a rotation axis of the actuator assembly 22. The reference axis AX0 extends in, for example, the second direction Z, and is substantially perpendicular to the bottom wall 12a. In the example shown in FIG. 3, an acceleration in a rightward direction is applied to the respective heads 17. For this reason, the respective heads 17 are displaced to the right side from the reference axis AX0 by substantially the same distance X0.

Figure 4:
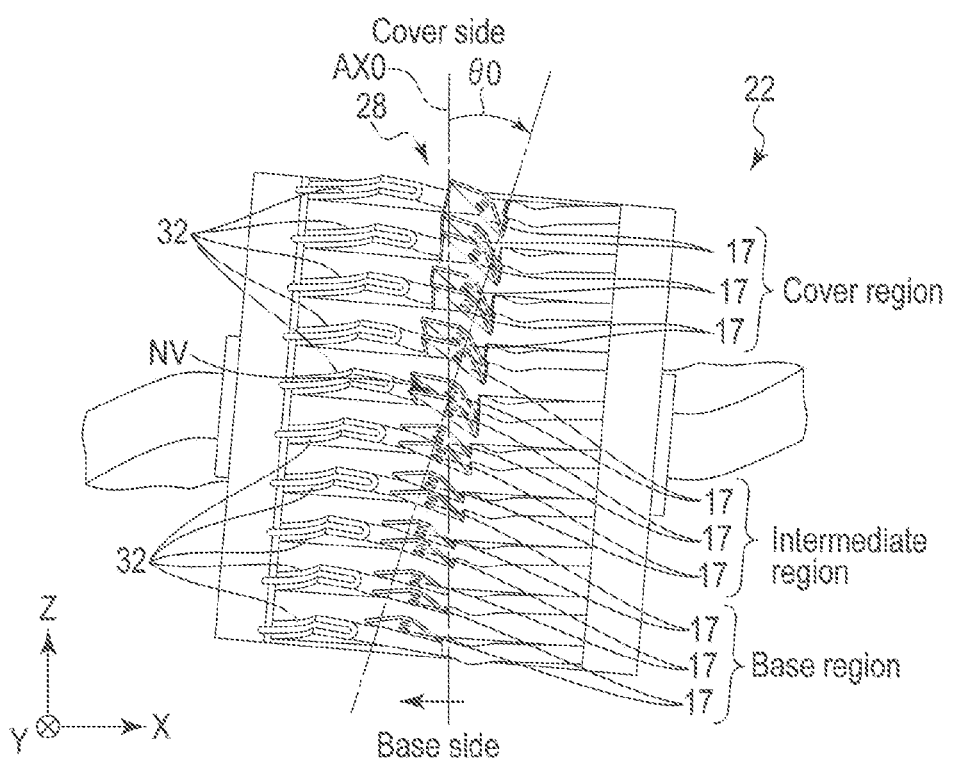
FIG. 4 is a schematic view showing an example of an actuator assembly when the magnetic disk device 1 vibrates at a frequency of 6.3 kHz or more to 9 kHz or less shown in FIG. 2.

FIG. 4 is a schematic view showing an example of the actuator assembly 22 when the magnetic disk device 1 vibrates at a frequency of 6.3 kHz or more to 9 kHz or less shown in FIG. 2. In FIG. 4, only components required for a description are shown.

When the magnetic disk device 1 vibrates at the frequency of 6.3 kHz or more to 9 kHz or less, the respective heads 17 vibrate while twisting around a node NV of vibration of the actuator assembly 22. Here, the node NV of vibration includes a portion having a slight amplitude without substantially vibrating as well as a portion having an amplitude of 0 without vibrating. In this case, an acceleration or an angular acceleration is applied to the respective heads 17. For this reason, the respective heads 17 rotate around the node NV in an X-Z plane. In the example shown in FIG. 4, an acceleration in a rightward direction or an angular acceleration in a clockwise direction is applied to the respective heads 17. For this reason, the respective heads rotate at an angle of θ0 around the node NV of vibration located on the reference axis AX0 in the X-Z plane. As shown in FIG. 4, the heads 17 of the cover side and the heads 17 of the base side significantly fluctuate because distances up to the node NV are large, and the intermediate heads 17 slightly fluctuate because distances up to the node NV are small.

Figure 5:
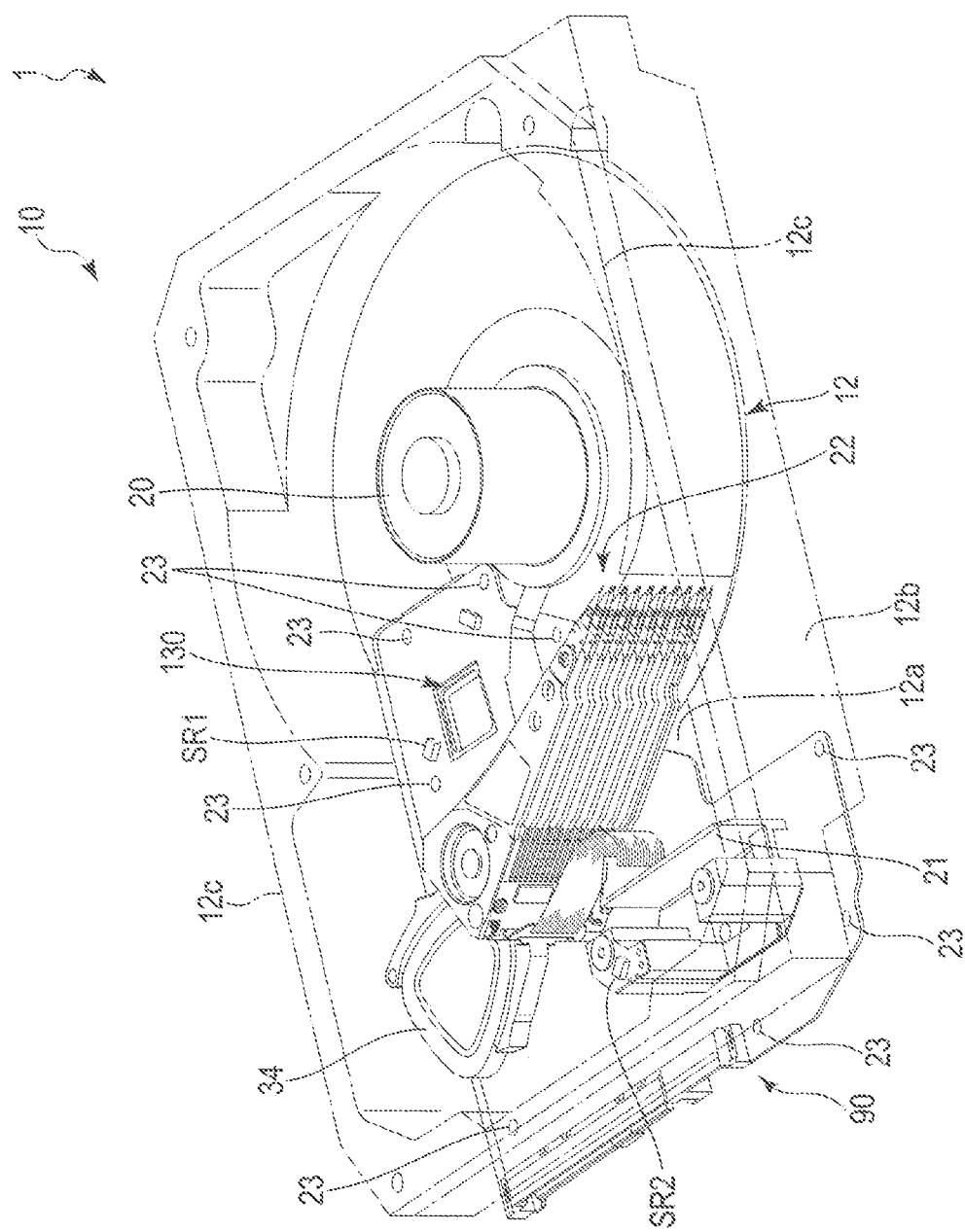
FIG. 5 is a schematic view showing an example of a disposition of sensors in the magnetic disk device 1.

FIG. 5 is a schematic view showing an example of a disposition of sensors SR1 and SR2 in the magnetic disk device 1. In FIG. 5, only components required for a description are shown.

At least one of the sensors SR1 and SR2 is disposed inside the housing 10, and the other of the sensors SR1 and SR2 is provided outside the housing 10. The sensors SR1 and SR2 are acceleration sensors detecting accelerations. For example, one of the sensors SR1 and SR2 may be an acceleration sensor, and the other of the sensors SR1 and SR2 may be an angular acceleration sensor. In the example shown in FIG. 5, the sensor SR1 is located on the inner surface of the control circuit board 90. The sensor SR2 is located on the board unit 21. The sensor SR1 may be located at another portion outside the housing 10. The sensor SR2 may be disposed at a portion other than the board unit 21 at an inner side and an upper side of the housing 10. The sensor SR2 may be located at an inner side and a lower side of the housing 10. In addition, the sensors SR1 and SR2 may be located at portions other than the portions described above as long as they are disposed in a region where a resonance mode other than a disturbance such as a sound pressure hardly occurs, that is, for example, a region fixed by screws, or the like.

Figure 6:
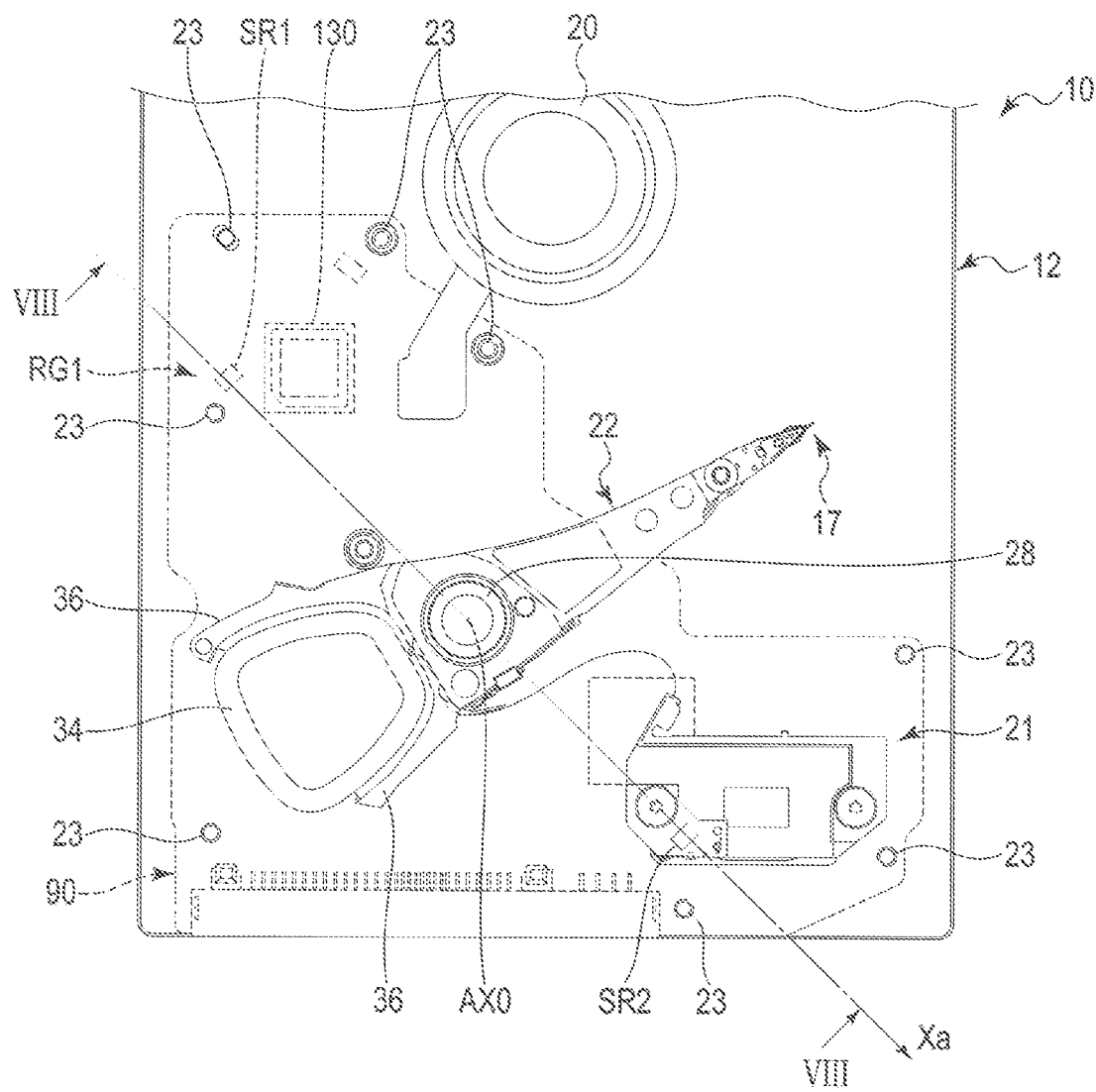
FIG. 6 is a plan view showing an example of a disposition of the sensors in the magnetic disk device 1.

FIG. 6 is a plan view showing an example of a disposition of the sensors SR1 and SR2 in the magnetic disk device 1. In FIG. 6, only components required for a description are shown.

In the example shown in FIG. 6, the sensors SR1 and SR2 are arranged on a straight line passing through the bearing unit 28, for example, the reference axis AX0 and are arranged substantially in parallel with a moving direction of the head 17, for example, the first direction X. Hereinafter, a direction in which the sensors SR1 and SR2 are arranged is referred to as an arrangement direction Xa. Although a case in which the sensors SR1 and SR2 are arranged in parallel to the moving direction of the head 17 is described, the sensors SR1 and SR2 may not be in parallel with the moving direction of the head 17 as long as they are arranged along the moving direction of the head 17. The sensors SR1 and SR2 are arranged along the moving direction of the head 17 as described above, such that it is possible to easily detect an influence on the head 17 when the magnetic disk device 1 vibrates at a specific frequency. The sensor SR1 and the sensor SR2 may not be disposed on the straight line passing through bearing unit 28 (the reference axis AX0). In addition, the sensors SR1 and SR2 may be arranged in a direction intersecting with the moving direction of the head 17. The sensor SR1 is located in a region RG1 of the control circuit board 90 screwed by the screws 23. In addition, the sensor SR1 may be located in another screwed region of the control circuit board 90 other than the region RG1.

FIG. 7 is a perspective view of the actuator assembly 22 and the FPC unit 21 viewed from one side.

As shown in FIG. 7, the actuator assembly 22 includes an actuator block 29 having a through-hole 80, the bearing unit (a unit bearing) 28 provided in the through-hole 80 and rotatable, the plurality of arms 32, for example, ten arms 32 extending from the actuator block 29 in the third direction (hereinafter, also referred to as an extending direction) Y, and the suspension assemblies 30 attached to the respective arms 32. The heads 17 are supported by the respective suspension assemblies 30 of the actuator assembly 22. The bearing unit 28 has a pivot standing on the bottom wall 12a of the base 12 in the vicinity of outer circumferences of the disks 18, a plurality of bearings attached to the pivot, a spacer disposed between the bearings, and the like. The plurality of bearings of the bearing unit 28 are fitted into the through-hole 80 of the actuator block 29, and are fixed to the actuator block 29 by an adhesive injected into the through-hole 80 or screws (not shown). In this way, the actuator assembly 22 is supported on the bottom wall 12a so as to be rotatable around the pivot of the bearing unit 28, for example, around the reference axis AX0 passing through the pivot.

In the present embodiment, the actuator block 29 and the ten arms 32 are formed integrally with each other using aluminum, or the like, to constitute a so-called E block. The arms 32 are formed in, for example, an elongated flat plate shape, and extends from the actuator block 29 in the third direction Y orthogonal to the pivot of the bearing unit 28. The ten arms 32 are arranged in the second direction Z, and are provided in parallel with each other a gap therebetween.

The actuator assembly 22 has a support frame 36 extending from the actuator block 29 in a direction opposite to the arm 32, and the voice coil 34 constituting a part of the VCM 24 is supported by the support frame 36. As shown in FIG. 1, the voice coil 34 is located between a pair of yokes 38 of which one is fixed onto the base 12, and constitutes the VCM 24 together with the yokes 38 and a magnet fixed to any of the yokes.

The actuator assembly 22 includes eighteen suspension assemblies 30 each supporting the heads 17, and these suspension assemblies 30 are attached to extending ends 32a of the arms 32, respectively. A plurality of suspension assemblies 30 include up-head suspension assemblies supporting the heads 17 upward and down-head suspension assemblies supporting the heads 17 downward. The up-head suspension assemblies and the down-head suspension assemblies are configured by disposing the suspension assemblies 30 having the same structure so that upward and downward directions of the suspension assemblies 30 are changed.

Each of the suspension assemblies 30 has a base plate 44 having a substantially rectangular shape, a load beam 46 formed of an elongated leaf spring, a pair of piezoelectric elements (PZT elements) 47, and a flexure (a wiring member) 48 transferring a write signal, a read signal, and a driving signal of the piezoelectric elements 47 and having an elongated band shape. A base end portion of the base plate 44 is fixed to the extending end 32a of the arm 32, and is, for example, caulked. A base end portion of the load beam 46 is overlapped with and fixed to an end portion of the base plate 44. The load beam 46 extends from the base plate 44, and is tapered toward an extending end. The base plate 44 and the load beam 46 are formed of, for example, stainless steel. The piezoelectric elements 47 finely control an operation of the head 17 by expansion and contraction operations. Hereinafter, a component including a control system controlling the piezoelectric elements 47, the piezoelectric elements 47, wirings connecting the control system and the piezoelectric elements to each other, and the like, and finely (for example, more finely than a control by the VCM 24) controlling the head 17 may be referred to as a micro actuator (MA).

The flexure 48 has a metal plate (a backing layer) formed of stainless steel, which is a base, an insulating layer formed on the metal plate, a conductive layer constituting a plurality of wirings (wiring patterns) formed on the insulating layer, and a protective layer (an insulating layer) covering the conductive layer to form a laminate having an elongated band shape.

The flexure 48 has a tip side portion attached onto surfaces of the load beam 46 and the base plate 44 and a base end side portion extending outwardly from a side edge of the base plate 44 and extending up to the base end portion (the actuator block 29) of the arm 32 along the side edge of the base plate 44 and the arm 32. A deformable gimbal portion (an elastic support portion) is provided at a tip portion of the flexure 48 located on the load beam 46, and the head 17 is mounted on the gimbal portion. The wirings of the flexure 48 are electrically connected to the head 17.

The base end side portion of the flexure 48 extends outwardly from the side edge of the base plate 44, and then extends up to the base end of the arm 32 along the side edge and one side edge of the arm 32. A connection end portion 48c of the flexure 48 is formed at one end of the base end side portion. The connection end portion 48c is formed in an elongated rectangular shape. The connection end portion 48c is bent at a right angle to the base end side portion, and is located substantially perpendicular to the arm 32. The connection end portions 48c is provided with a plurality of connection terminals (connection pads) 50 arranged in a row. These connection terminals 50 are connected to the wirings of the flexure 48, respectively. That is, the plurality of wirings of the flexure 48 extend over substantially the entire length of the flexure 48, and each have one end electrically connected to the head 17 and the other end connected to the connection terminals (the connection pads) 50 of the connection end portion 48c.

The FPC unit 21 has a base portion 60 having a substantially rectangular shape, a relay portion 62 extending from one side edge of the base portion 60 and having an elongated band shape, and a jointing portion 64 provided continuously at a tip portion of the relay portion 62 and having a substantially rectangular shape, which are formed integrally with one another. The base portion 60, the relay portion 62, and the jointing portion 64 are formed by a flexible printed circuit board. The flexible printed circuit board has an insulating layer formed of polyimide, or the like, a conductive layer formed on the insulating layer and forming wirings, connection pads, and the like, and a protective layer covering the conductive layer.

Electronic components such as a conversion connector (not shown) and a plurality of capacitors (not shown) are mounted on one surface (an outer surface) of the base portion 60, and are electrically connected to wirings (not shown). Each of metal plates 56 and 58 functioning as reinforcing plates are attached to the other surface (an inner surface) of the base portion 60. The base portion 60 is bent by 90 degrees at a portion between the metal plate 56 and the metal plate 58. In addition, in the base portion 60, a pedestal 51 formed of a resin, or the like, is formed on the metal plate 56. The pedestal 51 has protrusion portions 52 and 53 protruding upward in the second direction Z. In other words, the protrusion portions 52 and 53 protrude toward the cover side. A wiring 54 and the sensor SR2 are mounted on the protrusion portion 52. The wiring 54 extends from the outer surface of the base portion 60 to an upper surface 52s of the protrusion portion 52. The sensor SR2 is located on the upper surface 52s of the protrusion portion 52. The sensor SR2 may be located on an upper surface 53s of the protrusion portion 53. In addition, the wiring 54 may extend from the outer surface of the base portion 60 to the upper surface 53s of the protrusion portion 53. The wiring 54 has one end portion connected to the conversion connector, or the like, and the other end portion covering the upper surface 52s of the protrusion portion 52. The sensor SR2 is provided on the wiring 54, and is electrically connected to the wiring 54. The protrusion portions 52 and 53 have, for example, the same height as that of the actuator assembly 22 (the actuator block 29) or a height between a height of the metal plate 58 and the height of the actuator block 29. The protrusion portions 52 and 53 may also have a height higher or lower than that of the actuator block 29. In addition, the protrusion portions 52 and 53 may also have a height higher or lower than that of the metal plate 58. The base portion 60 is disposed on the bottom wall 12a of the housing 10, and is screwed to the bottom wall 12a of the housing 10 by two screws SW1 and SW2 each fitted into screw holes formed in the upper surfaces 52s and 53s of the protrusion portions 52 and 53. The screw SW1 is fitted into a screw hole formed in the wiring 54 disposed on the upper surface 52s and the protrusion portion 52, and the wiring 54 is fixed to the upper surface 52s of the protrusion portion 52. The sensor SR2 is located in a region RG2 fixed by the screw SW1 on the wiring 54. The conversion connector on the base portion 60 is connected to the control circuit board 90 provided on a bottom surface side of the housing 10. The relay portion 62 extends from the side edge of the base portion 60, turns substantially at a right angle, and extends toward the actuator assembly 22.

The jointing portion 64 provided at an extending end of the relay portion 62 is formed in a rectangular shape having a width that is substantially the same as the height (a thickness) of the actuator block 29. The jointing portion 64 has a plurality of connection pad groups corresponding to the connection end portion 48c of the flexure 48. A head IC (a head amplifier) 66 is mounted on the jointing portion 64. The head IC 66 is connected to the connection pad groups and the board unit 21 through wirings. In addition, the jointing portion 64 has a connection pad 68 for connecting the voice coil 34 thereto. A backing plate 70 formed of, for example, aluminum is attached as a reinforcing plate to an inner surface (a back surface) of the jointing portion 64. The backing plate 70 is formed to have substantially the same shape and size as those of the jointing portion 64, and is attached to substantially the entire surface of the jointing portion 64.

In the jointing portion 64 configured as described above, the backing plate 70 side is attached to one side surface (an installation surface) of the actuator block 29 extending in the second direction Z and the third direction Y, and is screwed to the installation surface by two fixing screws 72. The connection end portions 48c of the respective flexures 48 are drawn out to the installation surface of the actuator block 29, and are jointed to the jointing portion 64. In addition, a wiring of the voice coil 34 is connected to the connection pad 68 of the jointing portion 64.

In this way, eighteen heads 17 are electrically connected to the base portion 60 through the wirings and the connection end portions 48c of the flexures 48 and the jointing portion 64 and the relay portion 62 of the FPC unit 21, respectively. In addition, the base portion 60 is connected to the printed circuit board on the bottom surface side of the housing 10 through the conversion connector.

As shown in FIG. 5, in a state in which the actuator assembly 22 and the FPC unit 21 configured as described above are incorporated on the base 12, a lower end portion of the pivot of the bearing unit 28 is fixed to the base 12, and the bearing unit 28 stands substantially in parallel with a spindle of the spindle motor 20. Each of the disks 18 is disposed between two suspension assemblies 30. During an operation of a hard disk drive (HDD), the heads 17 attached to the suspension assemblies 30 face upper and lower surfaces of the magnetic disks 18, respectively. The base portion 60 of the FPC unit 21 is fixed to the bottom wall 12a of the base 12.

Figure 8:
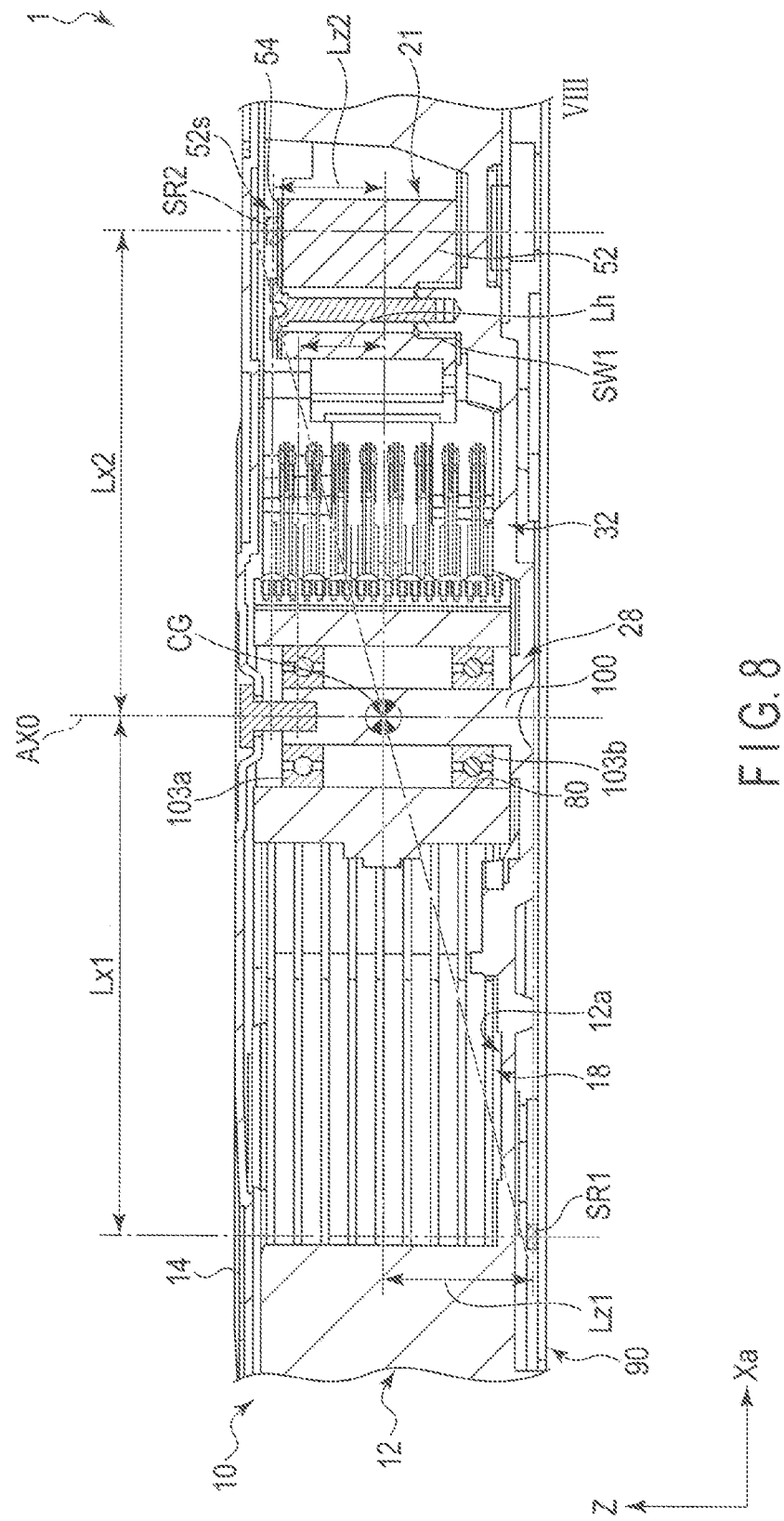
FIG. 8 is a cross-sectional view showing a configuration example of the magnetic disk device taken along line VIII-VIII shown in FIG. 6.

FIG. 8 is a cross-sectional view showing a configuration example of the magnetic disk device 1 taken along line VIII-VIII shown in FIG. 6. In FIG. 8, only components required for a description are shown. In FIG. 8, a position of the center of the actuator assembly 22 or a rotation center position (hereinafter simply referred to as a rotation center) CG at which the actuator vibrates are shown. Here, the rotation center includes not only a point of application of a resultant force of gravitational forces acting on the respective portions of an object, but also a portion that can be considered as being substantially equivalent to the point of application. In addition, in FIG. 8, a distance Lx1 between the rotation center CG and the sensor SR1 in an arrangement direction Xa, a distance Lx2 between the rotation center CG and the sensor SR2 in the arrangement direction Xa, a distance Lz1 between the rotation center CG and the sensor SR1 in the second direction Z, a distance Lz2 between the rotation center CG and the sensor SR2 in the second direction Z, and a distance Lh between the rotation center CG and a particular head 17 of the plurality of heads 17, for example, a head 17 executing read or write processing, in the second direction Z are shown. As shown in FIG. 8, the actuator block 29 is supported by bearings 103a and 103b, and rotates around, for example, a reference axis AX0 passing through a pivot 100.

The sensor SR1 is located in an opposite direction to the sensor SR2 with respect to the rotation center CG in the arrangement direction Xa. In addition, the sensor SR1 is located in an opposite direction to the sensor SR2 with respect to the rotation center CG in the second direction Z.

The sensor SR2 is located at the cover side inside the housing 10. The rotation center CG is detected by an analysis, or the like, and is located on, for example, the reference axis AX0. It is preferable that the sensors SR1 and SR2 are located at the same distance from the rotation center CG. That is, it is preferable that the sensors SR1 and SR2 are located so as to be point-symmetrical to each other with respect to the rotation center CG. In other words, it is preferable that the distance Lx1 and the distance Lx2 are the same as each other and the distance Lz1 and the distance Lz2 are the same as each other.

In the example shown in FIG. 8, an estimated acceleration Ah of a particular head 17 in the first direction X when the magnetic disk device 1 vibrates at a particular frequency due to a disturbance is represented by the following Equations:

$$Ah1 = 1/(Lz1+Lz2) \times (Lz2 \times A1 + Lz1 \times A2) \qquad \text{Equation (1)}$$

$$Ah2 = (A2 - A1) \times Lh/(Lz1+Lz2) \qquad \text{Equation (2)}$$

$$Ah = Ah1 + Ah2 \qquad \text{Equation (3)}.$$

Here, A1 is an acceleration detected by the sensor SR1, and A2 is an acceleration detected by the sensor SR2. In addition, Lh is a distance from the rotation center CG to the head 17 in the Z direction.

The estimated acceleration Ah of the head 17 executing the read processing or the write processing can be calculated by the above Equations (1) to (3).

Figure 9:
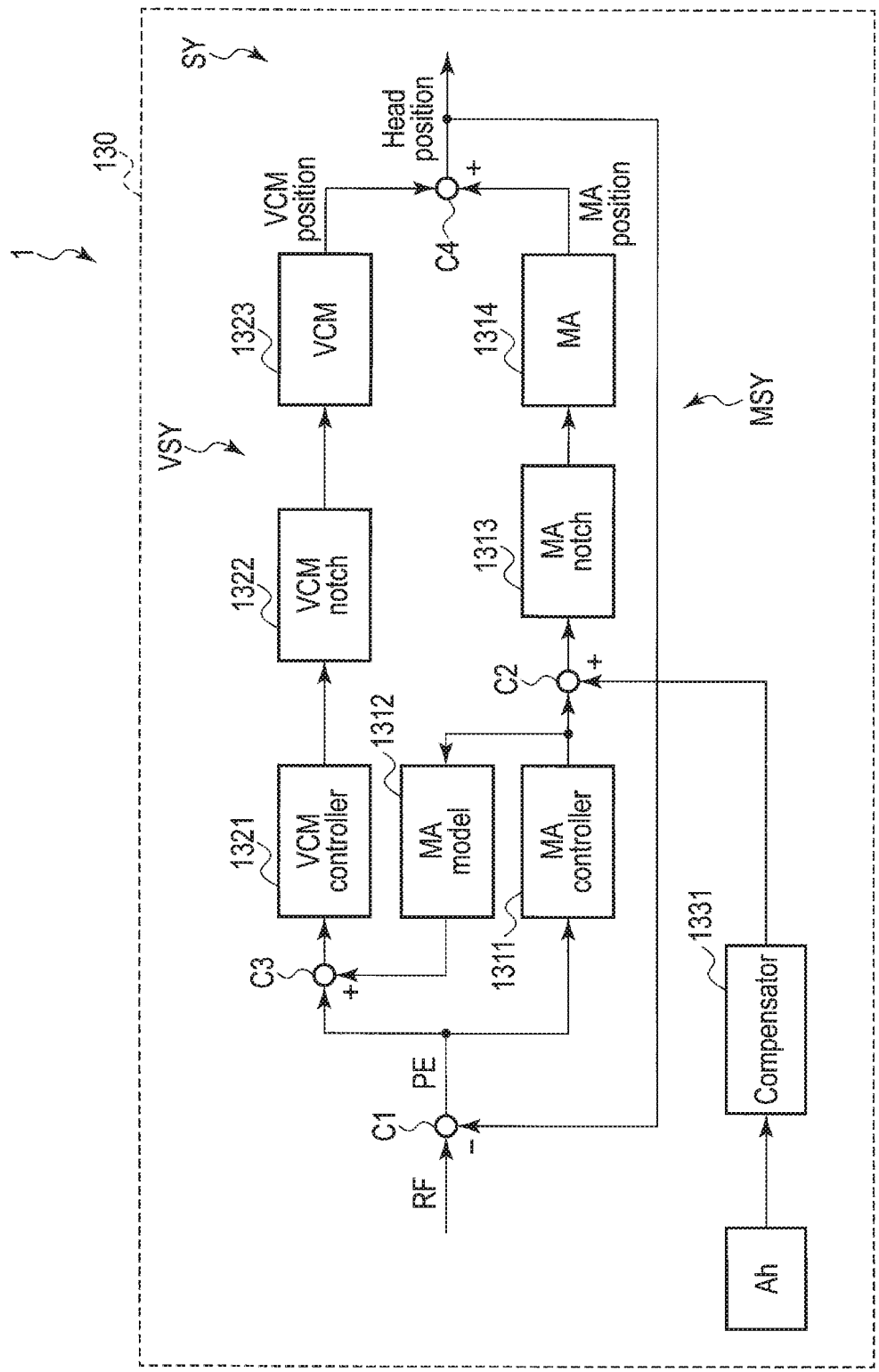
FIG. 9 is a view showing an example of a positioning control system of the head according to the first embodiment.

FIG. 9 is a view showing an example of a positioning control system SY of the head 17 according to the first embodiment.

The control section 130 is electrically connected to the sensor SR1, the sensor SR2, and the like, through, for example, the board unit 21. The control section 130 calculates an estimated acceleration Ah of a particular head 17, for example, a head 17 executing read processing or write processing based on the accelerations A1 and A2 detected by the sensor SR1 and the sensor SR2 and the above Equations (1) to (3). The control section 130 has a positioning control system SY for positioning the head 17.

The positioning control system SY includes an MA controller 1311, an MA model 1312, an MA notch 1313, an MA 1314, a VCM controller 1321, a VCM notch 1322, a VCM 1323, a compensator 1331, a manipulated variable C1, a manipulated variable C2, a manipulated variable C3, and a manipulated variable C4. Hereinafter, in the positioning control system SY, a control system of the VCM 24 may be referred to as a VCM control system VSY, and a control system of the MA may be referred to as an MA control system. The VCM control system VSY includes, for example, the VCM controller 1321, the VCM notch 1322, and the VCM 1323. The MA control system MSY includes, for example, the MA controller 1311, the MA model 1312, the MA notch 1313, and the MA 1314. The positioning control system SY inputs the estimated acceleration Ah to the MA control system MSY, for example, the manipulated variable C2 located between the MA controller 1311 and the MA notch 1313, in a feed-forward manner.

The MA controller 1311 generates a signal (hereinafter, referred to as an MA control signal) corresponding to a control amount controlling the MA based on a position error signal (PES) PE.

The MA model 1312 generates a signal (hereinafter, referred to as an estimated MA driving signal) corresponding to the next driving amount of the MA estimated based on the MA control signal.

The MA notch 1313 suppresses resonance characteristics, and generates a signal (hereinafter, referred to as an MA driving signal) corresponding to a driving amount actually driving the MA.

The MA 1314 is driven based on the MA driving amount.

The VCM controller 1321 generates a signal (hereinafter, referred to as a VCM control signal) corresponding to a control amount controlling the VCM 24 based on the positioning error PE and the estimated MA driving signal.

The VCM notch 1322 suppresses resonance characteristics, and generates a signal (hereinafter, referred to as a VCM driving signal) corresponding to a driving amount actually driving the VCM 24.

The VCM 1323 is driven based on the VCM driving signal.

The compensator 1331 generates a signal (hereinafter, referred to as an estimated acceleration signal) obtained by cutting off a low frequency component, a high frequency component, or the like, of the calculated estimated acceleration Ah. The compensator 1331 includes, for example, a filter cutting off the low frequency component, the high frequency component, or the like, of the estimated acceleration Ah, a double integrator, an integer, transfer characteristics of the actuator for an acceleration sensor, and the like. The filter is, for example, a band pass filter, and cuts off a low frequency component of about 1 kHz or less, a high frequency component of 10 kHz or more, or the like.

In the control section 130, when a target position of the disk 18 from or to which data are read or written is specified, the manipulated variable C1 receives a reference value RF and a current particular position of the head 17 (hereinafter, simply referred to as a current head position). The manipulated variable C1 outputs the positioning error PE obtained by subtracting the current head position from the reference value RF to the MA controller 1311 and the manipulated variable C3.

The MA controller 1311 receives the positioning error PE. The MA controller 1311 outputs the MA control signal to the MA model 1312 and the manipulated variable C2. The MA model 1312 receives the MA control signal, and outputs the estimated MA driving signal to the manipulated variable C3. The compensator 1331 receives the calculated estimated acceleration Ah of the particular head 17, and outputs the estimated acceleration signal to the manipulated variable C2. The manipulated variable C2 receives the MA control signal and the estimated acceleration signal. The manipulated variable C2 outputs an MA control signal obtained by adding the estimated acceleration signal to the MA control signal and suppressing an influence by vibrations of a specific frequency, for example, a frequency of 4 to 9 kHz to the MA notch 1313. The MA notch 1313 receives the MA control signal, and outputs the MA driving signal to the MA 1314. The MA 1314 is driven based on the MA driving signal, and outputs a position of the MA (hereinafter, referred to as a MA position) to the manipulated variable C4.

The manipulated variable C3 receives the position error signal PE and the estimated MA driving signal. The manipulated variable C3 outputs the position error signal PE to which the estimated MA driving signal is added to the VCM controller 1321. The VCM controller 1321 receives the position error signal PE, and outputs the VCM control signal to the VCM notch 1322. The VCM notch 1322 receives the VCM control signal, and outputs the VCM driving signal to the VCM 1323. The VCM 1323 is driven based on the VCM driving signal, and outputs a position of the VCM 24 (hereinafter, referred to as a VCM position) to the manipulated variable C4. The manipulated variable C4 outputs the target position (the current head position) of the particular head 17 obtained by adding the MA position to the VCM position.

According to the present embodiment, the magnetic disk device 1 includes the sensor SR1 disposed on the control circuit board 90, the sensor SR2 disposed on the board unit 21, the VCM 24 (the VCM 1323), the MA (the MA 1314), and the control section 130. The sensors SR1 and SR2 are located so as to be point-symmetrical to each other with respect to the rotation center CG. In addition, the sensors SR1 and SR2 may be arranged substantially in parallel with the moving direction of the head 17. The sensors SR1 and SR2 are disposed as described above, such that it is possible to detect an influence on the head 17 when the magnetic disk device 1 vibrates at a specific frequency, without being affected by other resonance modes. The control section 130 calculates the estimated acceleration Ah of the particular head 17 in the first direction X based on the acceleration A1 detected by the sensor SR1, the acceleration A2 detected by the sensor SR2, and the above Equations (1) to (3). The control section 130 inputs the calculated estimated acceleration Ah to the MA control system MSY in a feed forward manner to control the MA, such that it is possible to suppress a positioning error of each head 17 when the magnetic disk device 1 vibrates at a specific frequency, for example, a frequency of 4 to 9 kHz due to a disturbance, for example, a sound pressure. For this reason, in the magnetic disk device 1, positioning precision of each head 17 is improved.

In addition, with respect to a specific peak in the vicinity of about 2 kHz at which the base and the disk vibrate due to a rotation harmonic component (a component excited by magnetic force of the spindle motor) of the spindle motor, at least one of the accelerations A1 and A2 output from the acceleration sensor SR1 on the PCB and the acceleration sensor SR2 on the base is applied separately from the estimated acceleration Ah to each head, a peak of a specific rotation harmonic component in the vicinity of about 2 kHz is calculated by the compensator 1331, and when the estimated acceleration is input to the MA control system MSY in the feed forward manner so as to reduce the peak, the positioning accuracy of each head 17 is improved.

Next, a magnetic disk device according to a modified example will be described. In the modified example, the same portions as those of the abovementioned embodiment will be denoted by the same reference numerals, and a detailed description therefor will be omitted.

Modified Example

A magnetic disk device 1 according to a modified example is different in a configuration of a positioning control system SY from the magnetic disk device according to the abovementioned embodiment.

Figure 10:
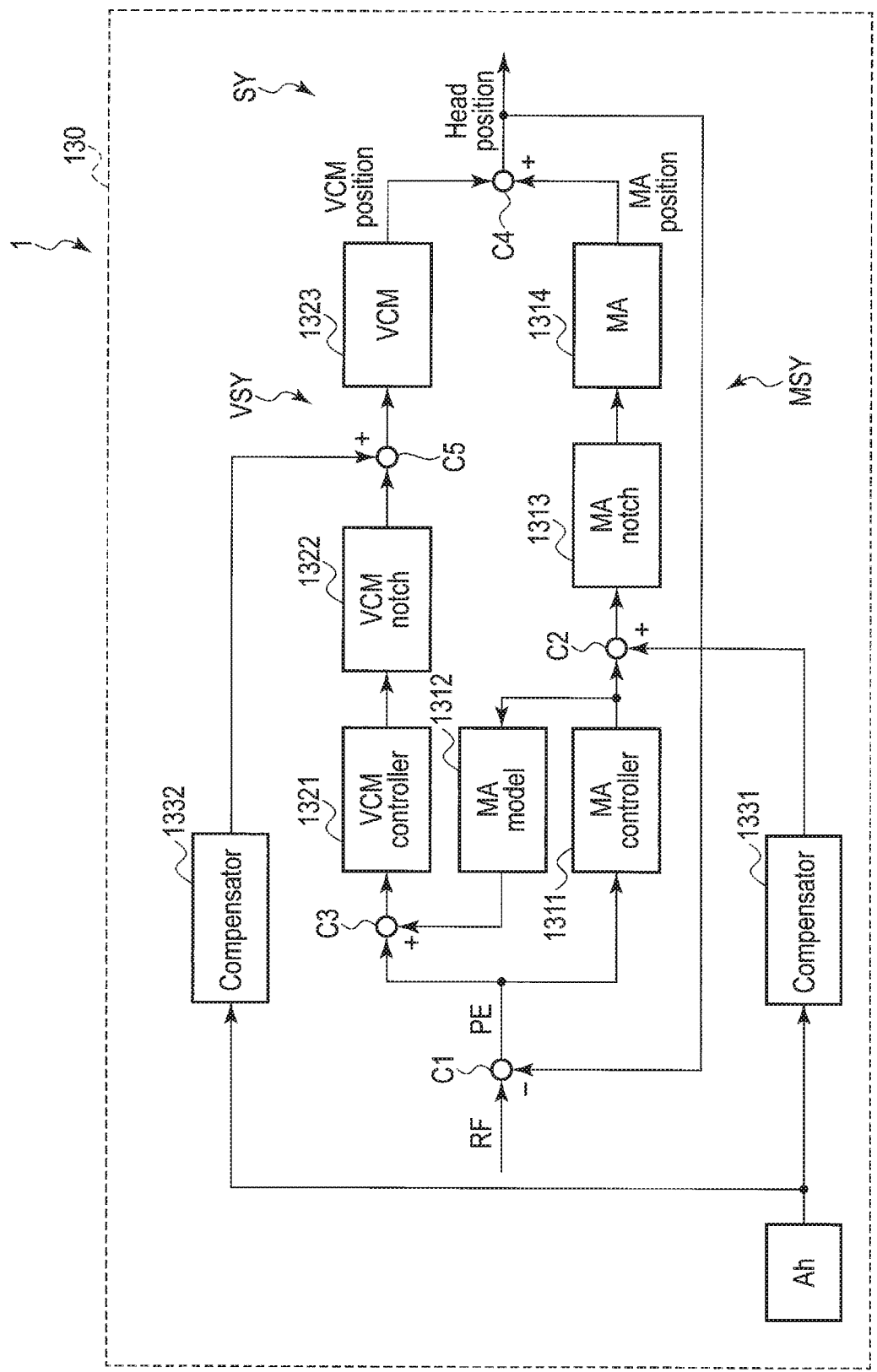
FIG. 10 is a view showing an example of a positioning control system of a head according to a modified example.

FIG. 10 is a view showing an example of a positioning control system SY of a head 17 according to a modified example.

The positioning control system SY further includes a compensator 1332 and a manipulated variable C5. The positioning control system SY inputs an estimated acceleration Ah to a VCM control system VSY, for example, a manipulated variable C2 and the manipulated variable C5 located between a VCM notch 1322, and a VCM 1323, in a feed-forward manner.

The compensator 1332 generates an estimated acceleration signal. The compensator 1332 includes, for example, a filter cutting off a low frequency component, a high frequency component, or the like, of the estimated acceleration Ah, a controller, an integer, transfer characteristics of an actuator for an acceleration sensor, and the like. The filter is, for example, a band pass filter, and cuts off a low frequency component of about 1 kHz or less, a high frequency component of 10 kHz or more, or the like.

A manipulated variable C3 receives a position error signal PE and an estimated MA driving signal. The manipulated variable C3 outputs the position error signal PE to which the estimated MA driving signal is added to a VCM controller 1321. The VCM controller 1321 receives the position error signal PE, and outputs a VCM control signal to the VCM notch 1322. The VCM notch 1322 receives the VCM control signal, and outputs a VCM driving signal to the manipulated variable C5. The compensator 1332 receives a calculated estimated acceleration Ah of a particular head 17, and outputs the estimated acceleration signal to the manipulated variable C5. The manipulated variable C5 outputs a VCM driving signal obtained by adding the estimated acceleration signal to the VCM driving signal and suppressing an influence by vibrations of a specific frequency, for example, a frequency of 4 to 9 kHz to the VCM 1323. The VCM 1323 is driven based on the VCM driving signal, and outputs a position of the VCM 24 (hereinafter, referred to as a VCM position) to the manipulated variable C4. The manipulated variable C4 outputs a target position of the particular head 17 obtained by adding an MA position to the VCM position.

According to the modified example, the magnetic disk device 1 inputs the calculated estimated acceleration Ah to the VCM control system VSY in a feed forward manner to control the VCM 24, such that it is possible to suppress an influence on a positioning error of each head 17 when the magnetic disk device 1 vibrates at a specific frequency, for example, a frequency of 4 to 9 kHz due to a disturbance, for example, a sound pressure. For this reason, in the magnetic disk device 1, positioning precision of each head 17 is improved.

In addition, with respect to a specific peak in the vicinity of about 2 kHz at which the base and the disk vibrate due to a rotation harmonic component (a component excited by magnetic force of the spindle motor) of the spindle motor, at least one of the accelerations A1 and A2 output from the acceleration sensor SR1 on the PCB and the acceleration sensor SR2 on the base is applied separately from the estimated acceleration Ah to each head, a peak of a specific rotation harmonic component in the vicinity of about 2 kHz is calculated by the compensator 1331 and the compensator 1332, and when the estimated acceleration is input to a position of the VCM 24 and the MA control system MSY in the feed forward manner so as to reduce the peak, the positioning accuracy of each head 17 is improved.

A case in which a low-density gas (an inert gas) (for example, helium) having a density lower than that of air is enclosed in the housing 10 is described, but the configurations of the abovementioned embodiment and the modified example can also be applied to a general magnetic disk device in which an inert gas is not enclosed. The general magnetic disk device has, for example, a structure in which the upper end opening of the base 12 is closed with one top cover rather than two covers such as the inner cover 14 and the outer cover 16.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a housing that comprises a base that comprises a bottom wall and side walls standing along a circumference of the bottom wall, and a cover facing the bottom wall and closing the base;
    an actuator assembly that is housed inside the housing and is rotatable around a rotation axis;
    a head movably supported by the actuator assembly;
    a control circuit board provided outside of the housing;
    a first sensor disposed on the control circuit board;
    a second sensor disposed inside the housing; and
    a fixed portion fixed in the housing, wherein
    the fixed portion comprises a protrusion portion that protrudes in a height direction from the bottom wall toward the cover inside the housing,
    the protrusion portion has an upper surface positioned the cover side in the height direction, and
    the second sensor is located on the upper surface.

2. The magnetic disk device according to claim 1, wherein
    the fixed portion is fixed to the bottom wall and is provided a first wiring electrically connecting the actuator assembly and the control circuit board to each other.

3. The magnetic disk device according to claim 2, wherein the fixed portion is provided a second wiring electrically connecting the control circuit board and the second sensor to each other.

4. The magnetic disk device according to claim 1, wherein
    the first sensor is located in a first region of the control circuit board fixed to outside of the bottom wall by a first screw, and
    the second sensor is located in a second region of a member fixed to the upper surface by a second screw.

5. A magnetic disk device comprising:
    a housing that comprises a base that comprises a bottom wall and side walls standing along a circumference of the bottom wall, and a cover facing the bottom wall and closing the base;
    an actuator assembly that is housed inside the housing and is rotatable around a rotation axis;
    a head movably supported by the actuator assembly;
    a control circuit board provided outside of the housing;
    a first sensor disposed on the control circuit board; and
    a second sensor disposed inside the housing, wherein
    the first sensor and the second sensor are arranged on a straight line passing through the rotation axis,
    the first sensor is located in an opposite direction to the second sensor with respect to a center of the actuator assembly in a height direction from the bottom wall toward the cover, and
    the second sensor is located at the cover side in the height direction.

6. The magnetic disk device according to claim 5, further comprising a fixed portion fixed in the housing, wherein
    the fixed portion comprises a protrusion portion that protrudes in the height direction, and
    the second sensor is provided on the protrusion portion.

7. The magnetic disk device according to claim 6,
    wherein the protrusion portion has an upper surface positioned the cover side in the height direction, and
    the second sensor is located on the upper surface.

8. The magnetic disk device according to claim 7, wherein the fixed portion is fixed to the bottom wall and is provided a first wiring electrically connecting the actuator assembly and the control circuit board to each other.

9. The magnetic disk device according to claim 8, wherein the fixed portion is provided a second wiring electrically connecting the control circuit board and the second sensor to each other.

10. A magnetic disk device comprising:
a housing that comprises a base that comprises a bottom wall and side walls standing along a circumference of the bottom wall, and a cover facing the bottom wall and closing the base;
an actuator assembly that is housed inside the housing and is rotatable around a rotation axis;
a head movably supported in a movement direction by the actuator assembly;
a control circuit board provided outside of the housing;
a first sensor disposed on the control circuit board;
a second sensor disposed inside the housing; and
a fixed portion fixed in the housing, wherein
the first sensor and the second sensor are located on opposite sides in a height direction from the bottom wall toward the cover,
the second sensor is located on the fixed portion.

11. The magnetic disk device according to claim 10, wherein
the first sensor detects a first acceleration in the movement direction.

12. The magnetic disk device according to claim 11, wherein
the second sensor detects a second acceleration in the movement direction.

13. The magnetic disk device according to claim 12, wherein
the fixed portion comprises a protrusion portion that protrudes in the height direction from the bottom wall toward the cover inside the housing,
the protrusion portion has an upper surface positioned the cover side in the height direction, and
the second sensor is located on the upper surface.

* * * * *